June 18, 1963  D. B. LE MAY ETAL  3,094,653
ELECTROSTATIC GENERATOR
Filed May 22, 1961  3 Sheets-Sheet 1
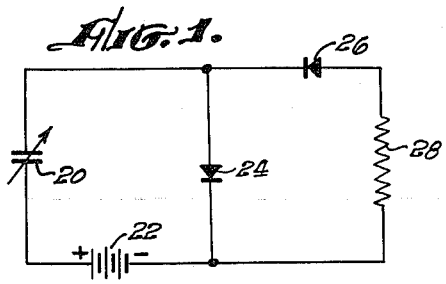
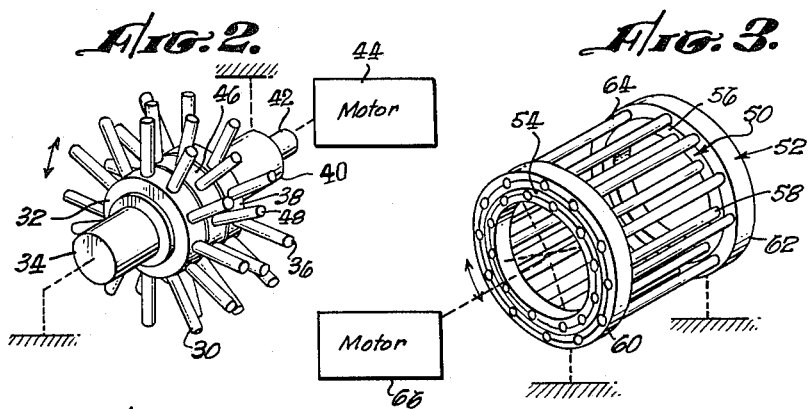
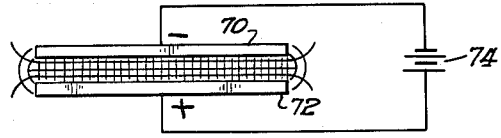
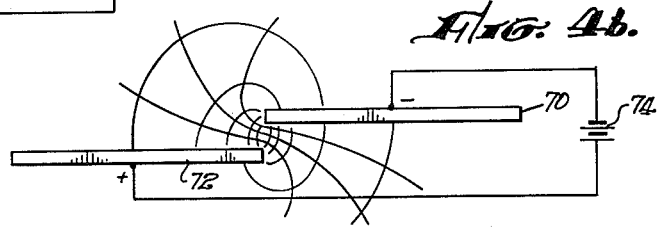
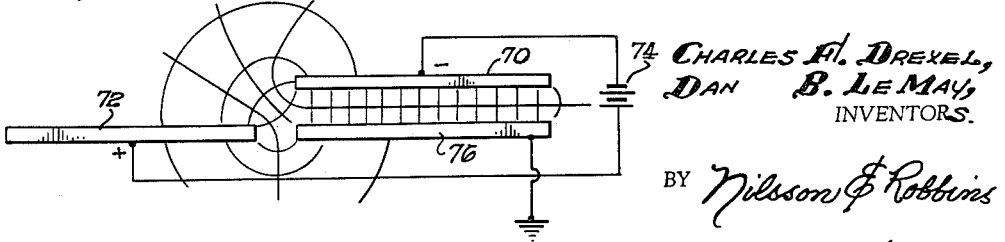
CHARLES H. DREXEL,
DAN B. LE MAY,
INVENTORS.
BY Nilsson & Robbins
ATTORNEYS June 18, 1963  D. B. LE MAY ETAL  3,094,653
ELECTROSTATIC GENERATOR
Filed May 22, 1961  3 Sheets-Sheet 2
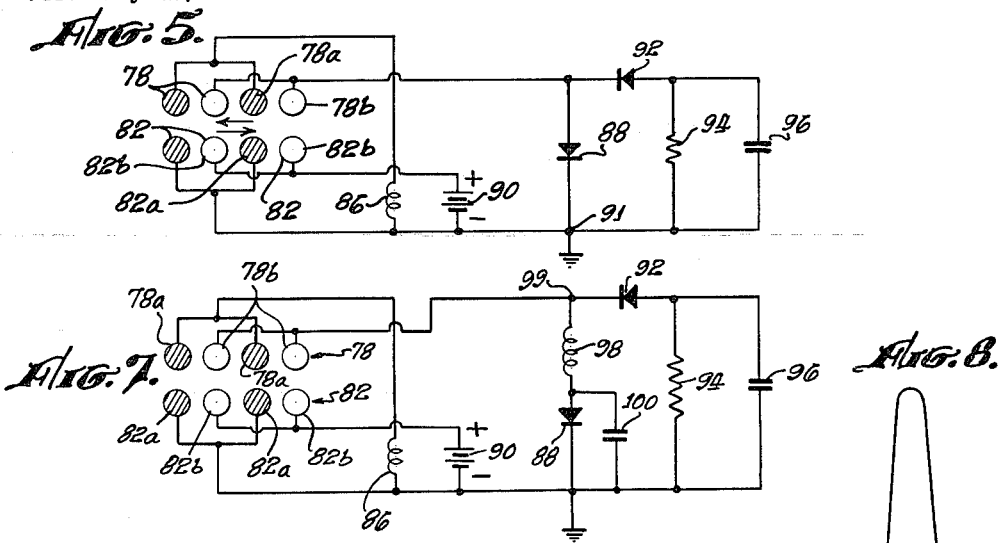
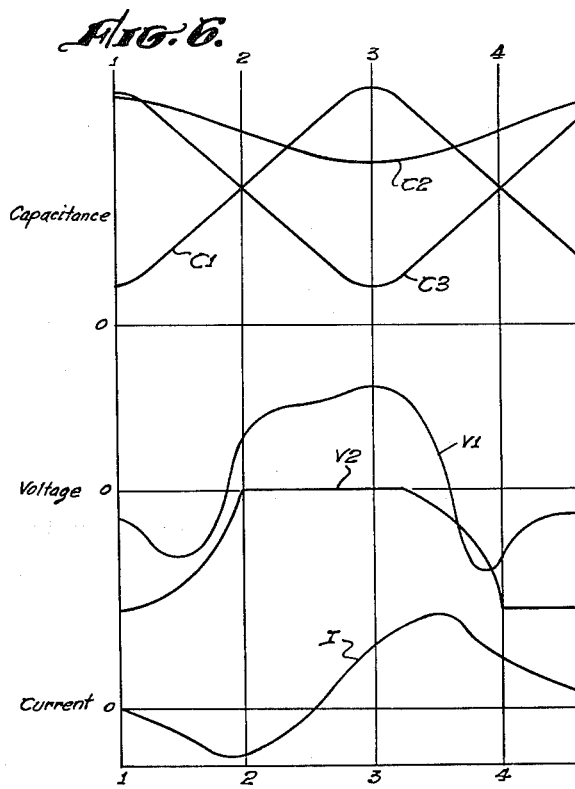
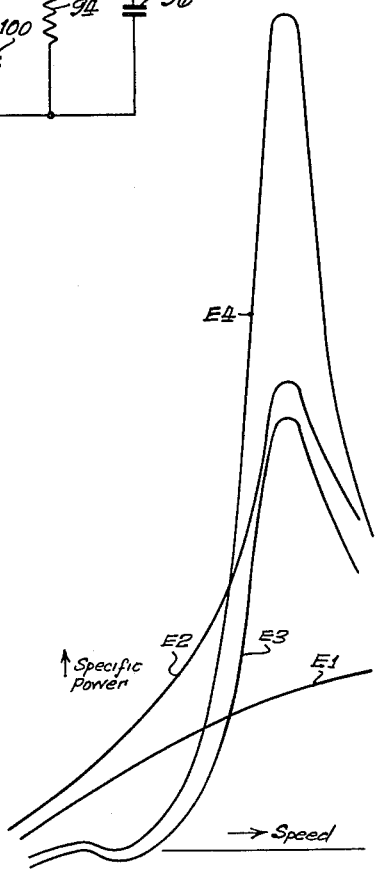
CHARLES H. DREXEL,
DAN B. LEMAY,
INVENTORS.
BY Nilsson & Robbins
ATTORNEYS.

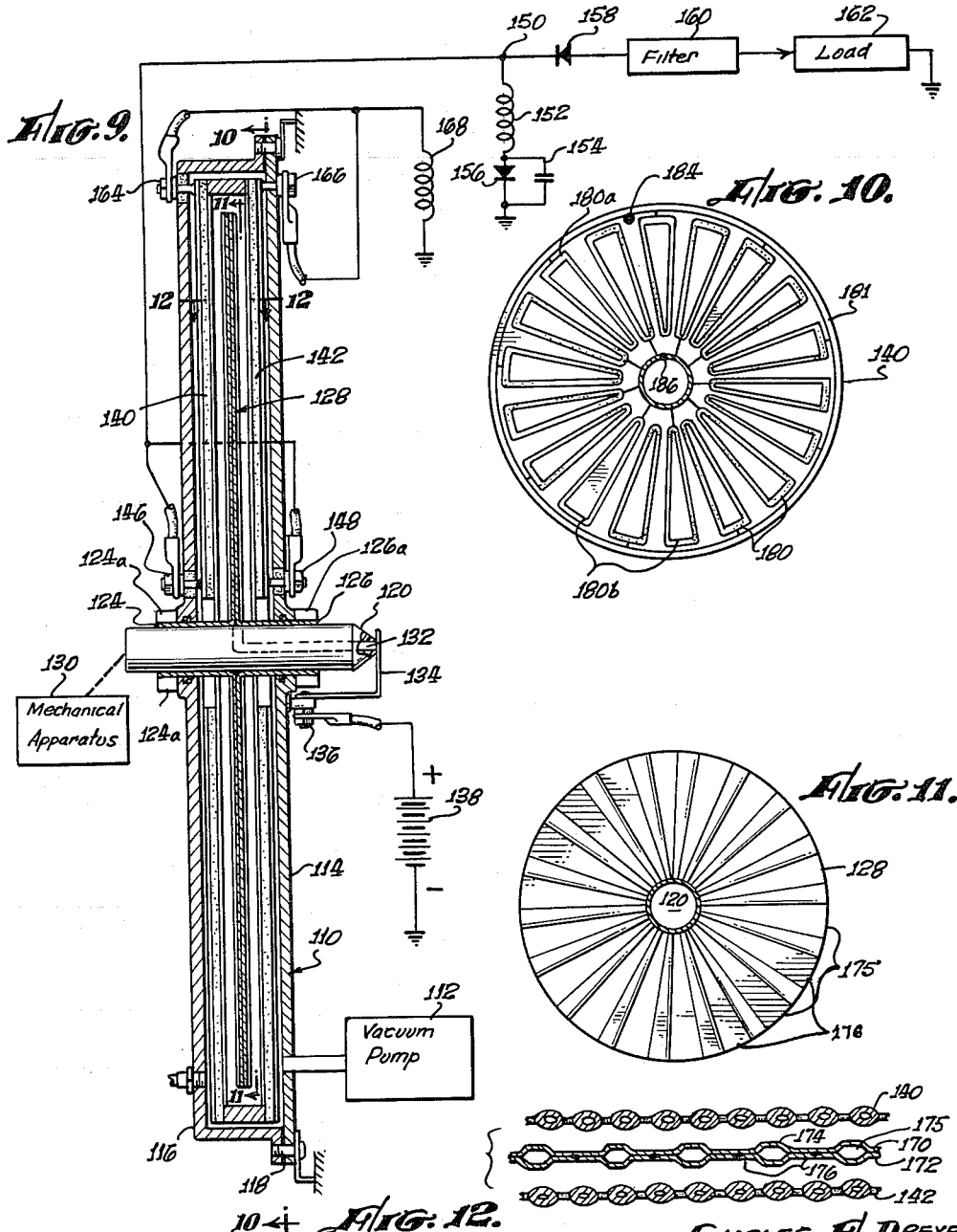

United States Patent Office 3,094,653
Patented June 18, 1963

3,094,653
ELECTROSTATIC GENERATOR
Dan B. Le May and Charles F. Drexel, Palos Verdes Estates, Calif., assignors to Tylan Corporation, Torrance, Calif., a corporation of California
Filed May 22, 1961, Ser. No. 111,614
19 Claims. (Cl. 322—2)

The present invention relates to an energy conversion machine of the type in which a variable capacitor is cyclically driven while being charged and discharged in synchronism with the cyclic variations in capacitance.

There are several different types of electrostatic machines which, for example, function to generate electrical energy from kinetic energy, or kinetic energy from electrical energy. One broad classification for these machines is based on whether conductive or non-conductive apparatus is employed to transport electrical charge within the system. The present invention relates to the class of machines in which electrical charge is transported through conductive apparatus. More specifically, the present invention relates to electrostatic systems in which a form of variable capacitor is mechanically driven to provide a cyclically-varying capacitance which is charged during intervals of high capacitance and discharged at intervals of low capacitance to provide electrical energy.

In general, previously-proposed variable-capacitor electrostatic generators (sometimes called electrostatic induction generators) have been capable of very-high efficiencies and could be embodied in relatively-light apparatus. These considerations result primarily from the fact that electrostatic fields may be sustained in air, vacuum, or other very light medium, while electromagnetic fields necessitate the use of heavy ferrous material. Further, the fields are caused by charges carried on surfaces, rather than by currents in conductors, so that the relatively heavy copper requirements of electromagnetic machines may be avoided. It has been found that electrostatic machines operating in a vacuum do not have the iron loss, copper loss, or windage loss of electromagnetic machines, thereby achieving their extremely high efficiency.

However, other considerations have prevented these machines from coming into widespread use. Specifically, prior electrostatic machines of this class have normally been of large size relative to their power capacity. Furthermore, practical use of prior machines has normally required extremely high voltage operation. Both of these drawbacks result from the nature of the electrostatic field, its requirement of high potential gradients for field strengths comparable to electromagnetic fields, and the limitations on potential gradients imposed by the breakdown of the dielectric medium. Therefore, considerable insulation and safety equipment has been required in prior electrostatic systems, and operation at moderate voltages has not been practical. Still further, certain forms of electrostatic induction generators have necessitated rather complex switching systems to charge and discharge the capacitors; these systems have not been commercially feasible.

In general, the present invention comprises an efficient electrostatic induction system capable of economical operation which may be embodied in a unit that is small in size relative to power capability. The system includes two sets of rod-like members, one set of which is revolved relative to the other, so that certain of the relatively-movable rods provide a variable capacitance. The other rods in the structure are then employed to shape the electrostatic field in a manner to produce a greater difference between the minimum and maximum capacitance of the apparatus, resulting in increased power conversion capability for the size of the unit. The variable capacitance structure is connected to an electrical system which charges and discharges the capacitance in a cyclically-varying manner. Reactive elements are then coupled to the system to cause voltage phase shifts in the system relative to the variable capacitance, to increase the charge applied and taken from the capacitance structure during the operating cycle, thereby further increasing the power-conversion capabilities of the system.

An object of the present invention is to provide an improved electrostatic induction system.

Another object of the present invention is to provide an electrostatic induction generator or motor which has a higher power conversion capability relative to physical size.

Still another object of the present invention is to provide an electrostatic energy conversion system which may be economically embodied in a relatively small-size apparatus.

A further object of the present invention is to provide an electrostatic induction motor or generator in which energy is more effectively converted to another form, by improving the shape of the electrostatic fields in the system.

Still a further object of the present invention is to provide an electrostatic induction generator or motor in which energy is effectively transformed to another form by the provision of reactive elements to tune the capacitive elements that are inherent in the system.

One further object of the present invention is to provide an improved system for efficiently converting energy from one form to another, wherein an electrostatic field is employed to intercouple the different forms of energy.

These and other objects of the present invention will become apparent from a consideration of the following taken in conjunction with the drawings, wherein:

FIGURE 1 is a schematic diagram illustrating the basic operation of a preliminary system to which the present invention may be applied;

FIGURE 2 is a perspective and diagrammatic representation of one form of variable capacitor which may be incorporated in an apparatus of the present invention;

FIGURE 3 is a perspective view of another form of variable capacitor which may be incorporated in an apparatus of the present invention;

FIGURES 4a, 4b and 4c are diagrammatic representations illustrating an aspect of the operation of a system incorporating the present invention;

FIGURE 5 is a circuit diagram incorporating one form of the present invention;

FIGURE 6 is a set of curves illustrating the operation of the system of FIGURE 5;

FIGURE 7 is a circuit diagram of another system incorporating the present invention;

FIGURE 8 is a series of curves illustrating the effectiveness of systems constructed in accordance with the present invention;

FIGURE 9 is a vertical sectional view and diagrammatic representation of an apparatus constructed in accordance with the present invention;

FIGURE 10 is a vertical sectional view along line 10—10 of FIGURE 9;

FIGURE 11 is a vertical sectional view along line 11—11 of FIGURE 9; and

FIGURE 12 is a horizontal sectional view along line 12—12 of FIGURE 9.

Referring initially to FIGURE 1, there is shown a preliminary form of an electrostatic induction generator. A variable capacitor 20 is connected in a serial loop with a battery (or other voltage source) 22 and a diode 24. A series circuit including a diode 26 and a resistor 28 is then connected across the diode 24. The diodes 24 and 26 are poled to accommodate current flow in opposite directions through the battery 22.

In the operation of the system of FIGURE 1, the variable capacitor 20 is driven as by a motor to provide a cyclically-variable capacitance, with the result that the mechanical energy employed to drive the capacitor 20 is converted to electrical energy supplied to the load resistor 28.

Considering the operation of the system of FIGURE 1 in detail, the capacitor 20 is driven to vary between maximum and minimum levels of capacitance. At a maximum level of capacitance, the capacitor 20 is charged to a charge level Q by the battery 22 through the diode 24. The voltage across the condenser 20 then equals $Q/C$ where C is the capacitance of the capacitor 20. Of course, this voltage coincides substantially to the voltage of the battery 22 less the voltage drop across the diode 24.

As the capacitance C of the capacitor 20 decreases toward the minimum value, the charge Q remains constant; therefore, the voltage across the capacitor increases to accommodate the decrease in capacitance ($V=Q/C$). The increased voltage across the capacitance 20 produces a current through the battery 22, the load resistor 28 and the diode 26. This current tends to recharge the battery 22 and additionally to provide energy to the load resistor 28.

In this manner, the mechanical energy employed to cyclically drive the variable capacitor 20 is manifest in the form of electrical energy consumed in the resistor 28. Therefore, in general, this basic operation of the electrostatic generator is similar to an electromagnetic generator, except that the field which couples the mechanical input energy to the electrical output energy is electrostatic rather than electromagnetic.

A wide variety of structure may be employed as the variable capacitor in an electrostatic generator. However, in the selected structure, it is normally desirable to reduce the ratio of the peak field voltage gradients to the average gradients by employing rounded capacitor elements, e.g. tubes or bars, rather than capacitor plates with sharp corners. Two variable capacitor structures employing these conductive bars are shown in FIGURES 2 and 3 and will now be considered in detail.

The structure of FIGURE 2 is a radial-bar variable-capacitor configuration wherein rows of radially-extending bars are mounted to be relatively movable, providing a variable capacitance between the rows. Specifically, a first row 30 of bars is mounted in a hub 32 and is carried on a fixed shaft 34. Similarly, another row 36 of radially-extending bars is supported in a hub 38 which is in turn mounted upon a fixed shaft 40. The shaft 40 telescopically receives a concentric shaft 42 which is mechanically coupled to a motor 44 and which carries a hub 46 supporting the row 48 of bars between the rows 30 and 36. The bars in each of the rows 30, 36, and 48 may be electrically interconnected by a conductor supported in the respective hubs. However, as the individual hubs 32, 38 and 46 are formed of insulating material, the separate rows are not electrically interconnected. Therefore, a variable capacitance exists between the individual rows 30, 36 and 48. This capacitance is somewhat similar to a common rotating plate capacitive structure; however, in order to reduce the peak field voltage gradients between the rows, the bars or capacitive elements are rounded to avoid sharp corners.

At a time when the row 48 of bars is in angular alignment with the bars in the rows 30 and 36, the bars are closest and there is maximum capacitance. As the row 48 revolves to be angularly offset from the bars in the rows 30 and 36 (as shown in the drawing), the capacitance between the rows drops to a minimum. Therefore, as the motor 44 revolves the bars in row 48, a cyclically varying capacitance is provided between these bars and the bars in the rows 30 and 36. In the application of this structure to the present invention, certain of the bars may be employed to shape the electrostatic field as will be described hereafter, while the remaining bars provide the desired variable capacitance. Of course, the number of rows provided in a configuration of this type may be varied to increase the capacitance, as may the size of the bars. Of course, these considerations are determined by the particular application of the system.

Referring now to FIGURE 3, there is shown another form of variable-capacitance structure which may be employed in a system of the present invention. The structure of FIGURE 3 includes two concentric generally cylindrical structures 50 and 52 which are mounted for relative rotation. These two structures are similar except for their size, and the smaller structure 50 is telescopically fitted concentrically into the larger structure 52. The smaller structure 50 includes a pair of insulating rings 54 and 56 which are held spaced apart by conductive bars 58 and are angularly offset in a circular configuration. A pair of insulating rings 60 and 62 of the structure 52 are concentrically mounted outside the rings 54 and 56 respectively and are held spaced apart by angularly offset conducting bars 64. The structure 52, comprising the rings 60 and 62 and the bars 64 is held fixed, while the structure 50, comprising the rings 54 and 56 and the bars 58 is mechanically supported upon the shaft of a motor 66. Therefore, upon energization of the motor 66, the bars 58 are revolved to pass the bars 64 in parallel relationship. As a result of this relative movement, a variable capacitance exists between the bars of the two structures. As in the structure of FIGURE 2 the individual bars in the separate structures may be electrically interconnected to provide a composite capacitance or alternatively certain of the bars may be employed for field shaping as described below. Thus the structure of FIG. 3, as well as the structure of FIG. 2 may be employed as the cyclically-varying capacitance in the system of FIGURE 1 to provide electrical energy from kinetic energy. In such a system, the energy would be provided from the motors 44 or 66, or from a prime mover; however, the source of the energy is not material to the present invention.

In the operation of an electrostatic generator as set forth above, the ratio of power conversion per unit size (and weight) of machine may be increased either by increasing the maximum capacitance or by decreasing the minimum capacitance of the variable capacitor. Of course it is apparent that as the energy conversion is accomplished in systems of the present invention by a varying capacitor, the effectiveness of the conversion depends upon the range over which the capacitor varies. In general, the efficiency of these systems is quite high even when operating with small capacitive range; however, in such systems the energy conversion capability or power rating of the system is low relative to physical size. One major aspect of the present invention resides in a structure for increasing the range of capacitive change, and will now be considered in detail. For purposes of illustration, a movable plate variable capacitor will be considered with reference to FIGS. 4a, 4b and 4c. The flat plate capacitor provides a good example of the universal principle to be described, because of the simple electrostatic field present in such a structure.

FIG. 4a shows a pair of spaced-apart conductive plates 70 and 72 in face-opposing relationship and individually connected to the terminals of a battery 74 or other voltage source. The electrostatic field between the plates 70 and 72 is indicated by lines of equal potential, and orthogonal flux lines which indicates the capacitance between the plates. FIG. 4b shows the plates 70 and 72 in an offset position, displaced out of face-opposing relationship to result in reduced capacitance between the plates. Again, the electrostatic field between the plates 70 and 72 is indicated by lines of equal potential and the orthogonal flux lines which designate the capacitance between the plates.

As previously indicated, any consideration which can result in greater capacitance for the plates in the configuration of FIG. 4a, or reduced capacitance between the plates in the configuration of FIG. 4b, results in more effective energy conversion in an electrostatic generator. The system of the present invention includes a structure for shaping the electrostatic field between the plates 70 and 72, to reduce the capacitance therebetween when these plates are in the minimum-capacitance configuration. This field-shaping is accomplished by the introduction of additional conductors to influence the field between the capacitive conductors.

Referring to FIG. 4c, the plates 70 and 72 are again shown in the minimum-capacitance position; however, another plate 76 is shown in face-opposing relationship to the plate 70. The plate 76 is connected to ground or other independent potential. As a result, an electrostatic field is provided between the plates 70 and 76, to alter the field shape and the potential gradients, as indicated in FIG. 4c. The electric field and the capacitance between the plates 70 and 72 is substantially reduced, while the maximum capacitance between these plates (when aligned in face-opposing relationship as shown in FIG. 4a) remains substantially unchanged.

These same considerations apply in a similar fashion to bar conductors or other configurations of variable capacitors. Of course, the grounded or field-shaping plates as the plate 76 may be provided in both the stator and the rotor of a variable capacitor, or may be carried by only one of these structures.

Referring now to FIG. 5, there is shown a system incorporating field-shaping electrodes, and utilizing capacitive structures comprising bars which may take the form generally illustrated in FIGS. 2 and 3. In FIG. 5, the stator bars are diagrammatically represented aligned in one row 78 and the rotor bars are similarly shown to be aligned in an adjacent row 82. Of course, either of the rows 78 and 82 may comprise a stator while the other comprises the rotor since relative rotation is all that is necessary. However, in the prior art, it has become somewhat common to term the rotor conductors as charge inductors while terming the stator conductors as charge conveyors.

In the system of FIG. 5, grounded field-shaping electrodes or conductors are provided in both the row 78 and the row 82, and are designated bars 78a and 82a shown shaded. The electrodes 82a are connected directly to ground; however, the electrodes 78a are connected to ground through an inductor 86. The function of the inductor 86 will be considered hereinafter.

The conductive bars serving as capacitance elements in the two rows are designated 78b and 82b, respectively. The bars 78b (in the row 78) and the bars 82b (in the row 82) are connected in a circuit configuration somewhat as shown in FIGURE 1. Specifically, the bars 78b are connected in a serial loop with a diode 88 and a battery 90. The junction point 91 between the diode 88 and the battery 90 is grounded, and a diode 92 serially-connected with a load resistor 94 is connected across the diode 88. A capacitor 96 is connected across the load resistor 94, and serves as a filter for the load current.

In the operation of the system, relative movement is provided between the row 78 and the row 82 producing a cyclically variable capacitance to cause the system to function as the system of FIG. 1. That is, during the interval of high capacitance between the rows 78 and 82 (as shown in FIG. 5), the capacitive structure is charged by the battery 90 through the diode 88. Then as the bars are separated to reduce the capacitance, the voltage across them increases causing a current to flow in the opposite direction through the battery 90, the load resistor 94 and the diode 92. As alternate bars in each of the rows 78 and 82 are grounded, the electrostatic field is shaped to reduce the minimum capacitance between the bars 78b and 82b as disclosed with respect to FIG. 4. As a result, the capacitance variation is greater, and more charge is transferred through the load on each electrical cycle.

In the operation of the system of FIG. 5 to convert mechanical energy into electrical energy, a generally capacitive electrical system is provided. Therefore, the phase relationships within the system are generally those attendant a capacitive apparatus. In view of this consideration, the present invention includes the provision of inductors to produce phase shifts and resonant voltage amplifications which increase the effective power-conversion capabilities of the system. In FIG. 5 such an inductance 86 is connected between the bars 78a and ground. The operation of the system of FIG. 5, including the inductor 86 is graphically illustrated in FIG. 6 which includes plots of capacitance, voltage, and electrical current versus position of the capacitive structure. The upper family of curves in FIG. 6 are capacitance plots, in which curve C1 is a plot of the varying capacitance between the conductive bars 78b and 82b. The curves C2 is a plot of the capacitance between the bars 78a and 78b, while the curve C3 is a plot of the capacitance between the bars 78a and the bars 82b. Of course, the curves are plotted against a uniform variation in relative positions between the row 78 and the row 82, the curves beginning at a point of minimum capacitance for the structure. FIG. 5 illustrates the relative position designated as 3 in FIG. 6.

The voltage curves in FIG. 6 are plotted on the same base as the capacitance curves, and include a curve V1 representative of the voltage across the inductance 86, and a curve V2 representative of the voltage on the bars 78b relative to ground potential. The curve I, illustrates electrical current flow through the inductor 86, and is also plotted with respect to capacitive displacement.

Considering the operation of the inductance 86; in view of the capacitance between the grounded bars 78a and the capacitively-charged bars 82b (connected to the battery 90) a charge is deposited on the bars 78a. Of course in the absence of the inductance 86, this charge would be immediately passed to ground potential. However, by providing the inductance 86, the voltage of curve V1 is developed across this element. This voltage serves to produce further field shaping between the bars to result in more effective power conversion. That is, the voltage of curve V1 appears on the bars 78a in phase with the capacitance C1 so that the field influence of bars 78a serves to increase the charge induced at or near the maximum of capacitance C1 and also serves, by reducing the field strength, to reduce the minimum charge held on bars 78b and 82b at or near the instant of minimum capacitance. Thus the variation in the electrostatic field causes the system to absorb more torque, resulting in increased power-conversion capability for the system.

In addition to the provision of the inductor 86 as shown in FIG. 5, other circuit configurations employing inductors are possible to further affect resonant current surges which increase and decrease the field voltages in proper phase relationship with the capacitance variation, to increase the amplitude of the capacitor alternating current. One such other variation is shown in FIG. 7 which employs bars similar to those of FIG. 5 and in which like elements are similarly identified. In the system of FIG. 7, an inductance 98 is connected between the diode 88 and the junction point 99, between the diode 92 and the bars 78b. Furthermore, a capacitor 100 is connected across the diode 88. In general, the added resonant circuit provides further current surges in the desired phase relationship with the capacitance variation. Also, the resonance between the inductor 98 and the capacitor 100 tends to produce higher voltages in the electric field of the variable capacitor relative to the voltages across the excitation source 90 and the load 94. The capability of the machine to achieve high power from a small size of variable capacitor is thereby greatly improved.

A graphic indication of the improvement of a system resulting from the application of certain principles of the present invention may be seen from a consideration of FIG. 8 which includes several curves descriptive of various apparatus, and wherein speed is plotted along the abscissa versus specific power along the ordinate. Specific power is herein defined as the power output per unit of excitation voltage squared ($P/Eo^2$) for a given size and configuration of machine.

The curve E1 is indicative of the operating characteristic of the simple system shown in FIG. 1. The curve E2 (indicating substantial improvement in performance) is indicative of the system of FIG. 5. The curve E3 indicates the improvement of the system of FIG. 7 (without the aspect described with respect to FIG. 5), while the curve E4 indicates the operation of the system of FIG. 7 as shown. It is apparent that the power conversion capabilities of the system of FIG. 7 (indicated by the curve E4) are greatly improved over the simple system which does not include these aspects of the present invention, particularly if the generator is operated at a fixed speed, or if means are provided to adjust the inductance or capacitance values of members 86, 98, and 100 to give the tuned peak power at whatever speed the machine is being operated.

Although various aspects of the present invention may be differently applied to electrostatic machines, to accomplish the desired results, one specific illustration of an operating machine is shown in FIGS. 9, 10, 11 and 12, and will now be considered in detail.

The system is mounted in a housing 110 which is sealed and maintained evacuated by a vacuum pump 112. By operating the cyclically-variable capacitor apparatus in a relatively-high vacuum, insulation problems are reduced and windage losses are minimized. The housing 110 has a flat cylindrical form and consists of a circular plate 114 bolted to a cup-shaped member 116 with an annular seal 118 provided at the junction between these members.

A mechanical shaft 120 passes concentrically through the housing 110 and is journalled into bearings 124 and 126, which incorporate vacuum seals 124a and 126a. The shaft 120 has a rotor 128 coaxially fixed thereon and is connected to a mechanical apparatus 130 by which the shaft is driven. The shaft 120 (formed of insulating material) has a conductive section 132 formed therein, which serves to electrically connect the rotor 128 through a brush 134 and a lug 136 to one terminal of a battery 138, the other terminal of which is grounded.

In general, the basic electrical system is similar to that of FIG. 7 with the stator elements being connected by lugs 146 and 148 to a junction point 150 which is connected through an inductor 152 and a capacitor 154 to ground. A diode 156 is connected in parallel with the capacitor 154. The junction point 150 is also connected through a diode 158 to a filter 160 which is in turn connected to a load 162. The field-shaping electrodes in the stator elements 140 and 142 are connected from lugs 164 and 166 through an inductance 168 to ground.

Considering the cyclically-varying capacitance apparatus in greater detail, the rotor comprises a pair of plates 170 and 172 (FIG. 12), which are formed with angularly-offset radiating grooves 174 that are interconnected by spot welds 176 so that the grooves 174 essentially form radiating bars 175. In this structure, the rotor is entirely conductive material e.g. metal, formed to comprise radiating tubes 175 (FIG. 11) which are connected through the shaft conductor 132 and the brush 134 to the battery 138.

The stator elements 140 and 142 are similar and comprise a plurality of tubes 180 (FIG. 10) radiating in a plane from an axial location in the stator element and supported in a circular stator mounting 181 by being imbedded therein. The tubes 180 are formed of metal and the mounting 181 supporting the tubes is formed of insulating material as a casting of epoxy material. Alternate of the tubes 180 are designated 180a and are electrically connected to a terminal 184 which is contacted by one of the lugs 164 or 166. The remaining bars 180b are electrically interconnected at the center of the structure and contacted by one of the lugs 146 or 148 at a point 186.

The lugs 164 and 166 are connected through the inductance 168 to ground, with the bars 180a employed as field-forming bars while the bars 180b are the actual variable-capacitance elements. In this structure, only the stator is provided with field-shaping electrodes; however, it is to be understood, that in various other embodiments, field-shaping electrodes may be provided in both the stator and the rotor, or in only one structure, as clearly taught with respect to FIGS. 5 and 7. Also, in the system of FIG. 9, only a single rotor plate is provided; however, it is to be clearly understood that a large number of intermeshed rotor and stator plates may be provided in systems of the present invention, depending upon the rated power conversion capability of the system.

In the operation of the system of FIG. 9, the rotor 128 is revolved relative to the stator elements 140 and 142 by the mechanical apparatus 130. Therefore, the tubular rotor bars are driven in and out of alignment with the radiating stator bars 180b. Therefore, the connections to these elements (lugs 146 and 148, and brush 134) experience a cyclically-varying capacitance. The stator bars 180a extend the range of this capacitance in the manner described with respect to FIG. 4.

During intervals of high capacitance, the cyclic capacitive structure is charged by the battery 138 through the inductance 152 and the diode 156. As the capacitance of the structure decreases, the voltage therein increases, providing a current through the diode 158, and the filter 160 to the load 162. Thus, mechanical energy from the mechanical apparatus 130 is efficiently converted into electrical energy and supplied in that form to the load 162.

While the previous discussions have pertained primarily to electrostatic generators, it is to be understood that the important features of the present invention apply equally to electrostatic motors.

An important feature of the present invention resides in the structure disclosed in FIG. 9, which may be economically manufactured, and used in practical electrical systems.

Another important feature of the invention resides in the use of field-forming electrodes in the stator or rotor, or both the stator and the rotor to accomplish more effective energy transitions.

One other important feature of the invention resides in the provision of inductance elements to further increase the effectiveness of the system.

It should be noted that although the particular embodiment of the invention herein described is fully capable of providing the features and achieving the objects set forth, such embodiments are merely illustrative and this invention is not to be limited to the details of construction illustrated and described herein, except as defined by the appended claims.

What is claimed is:

1. An electrostatic energy conversion system for use between a mechanical means for carrying mechanical energy and an electrical means for carrying electrical energy, comprising: a variable capacitance means; means for mechanically coupling said variable capacitance means to said mechanical means, whereby said variable capacitance means undergoes a cyclic capacitive variation upon said mechanical means carrying energy; switch means for electrically coupling said variable capacitance means to said electrical means, whereby the voltage on said capacitance means is varied in relation to the capacitance thereof; and inductive means coupled to said capacitance means whereby to alter the phase angle of electrical energy of said capacitance means.

2. An electrostatic energy conversion system for use between a mechanical means for carrying mechanical energy and an electrical means for carrying electrical energy, comprising: a variable capacitance means; means for mechanically coupling said variable capacitance means to said mechanical means, whereby said variable capacitance means undergoes a cyclic capacitive variation upon said mechanical means carrying energy; switch means for electrically coupling said variable capacitance means to said electrical means, whereby the voltage on said capacitance means is varied in relation to the capacitance thereof; and at least one field-shaping electrode positioned adjacent said variable capacitance means, whereby to effect the variations of capacitance of said variable capacitance means.

3. An electrostatic energy conversion system for use between a mechanical means for carrying mechanical energy and an electrical means for carrying electrical energy, comprising: a variable capacitance means including at least one first row of cylindrical conductive elements and at least one second row of cylindrical conductive elements movable relative to said first row of cylindrical conductive elements whereby to provide a variable capacitance; means for mechanically coupling said variable capacitance means to said mechanical means, whereby said variable capacitance means undergoes a cyclic capacitive variation upon said mechanical means carrying energy; and switch means for electrically coupling said variable capacitance means to said electrical means, whereby the voltage on said capacitance means is varied in relation to the capacitance thereof.

4. Apparatus according to claim 3 wherein said first row of cylindrical elements comprise a pair of radially-grooved plates affixed together to form radiating tubular elements, and said second row of cylindrical conductive elements comprise radially mounted elongate tubular members.

5. Apparatus according to claim 3 wherein said first and second rows of cylindrical elements comprise angularly-offset parallel tubes arranged in a circular configuration, and said second row of tubes is mounted concentrically inside said first row of tubes.

6. An electrostatic energy conversion system for use between a mechanical means for carrying mechanical energy and an electrical means for carrying electrical energy comprising: a variable capacitance means; means for mechanically coupling said variable capacitance means to said mechanical means whereby said variable capacitance means undergoes a cyclic capacitive variation upon said mechanical means carry-energy; switch means for electrically coupling said variable capacitance means to said electrical means, whereby the voltage on said capacitance means is varied in relation to the capacitance thereof; a plurality of field-shaping electrodes positioned adjacent said variable capacitance means, whereby to effect the variations of capacitance of said variable capacitance means; and a reactance circuit means coupled to said capacitance means whereby to alter the phase angle of electrical energy of said capacitance means.

7. An electrostatic generator for providing electrical energy when driven by a mechanical apparatus, comprising: a first set of conductors; a second set of conductors movably mounted relative to said first set of conductors and adapted to be driven by said mechanical apparatus to provide a cyclically varying capacitance between conductors of said first and second sets; means electrically interconnecting certain conductors in said first set; means electrically interconnecting certain conductors in said second set; switch means for electrically coupling said certain conductors as a capacitance, to be charged during intervals of high capacitance and discharged during intervals of low capacitance; and means for connecting other of said conductors to a source of reference potential whereby to shape the electrostatic field between said certain conductors of said first set and said certain conductors of said second set.

8. Apparatus according to claim 7 wherein said other of said conductors include conductors in both said first and said second sets.

9. Apparatus according to claim 7 wherein said other of said conductors include conductors all of which are in said first set.

10. Apparatus according to claim 7 wherein said other of said conductors include conductors, all of which are in said second set.

11. Apparatus according to claim 7 wherein said means for connecting said other of said conductors to a source of reference potential comprises an inductance.

12. Apparatus according to claim 7 wherein said switch means includes an inductance to tune the capacitance between said certain conductors.

13. An electrostatic generator adapted to be mechanically connected to a rotative shaft to receive mechanical energy, and electrically connected to a source of electrical potential to recieve field energy, whereby to provide electrical energy, comprising: a first set of tubular conductors; a second set of tubular conductors mounted to be revolved by said rotative shaft adjacent to said first set of tubular conductors; a first unilateral current path connecting certain of said first set of conductors and certain of said second set of conductors across said source of electrical potential to charge said certain conductors; a second unilateral current path connected to said certain of said first set of conductors and said certain of said second set of conductors to provide electrical energy by discharging said conductors; and means connecting other of said tubular conductors to a source of reference potential to thereby effect the electrostatic field between said certain conductors of said first set and said certain conductors of said second set.

14. Apparatus according to claim 13 wherein said means connecting other of said tubular conductors, includes an inductance.

15. Apparatus according to claim 13 wherein said first unilateral current path includes an inductance.

16. Apparatus according to claim 13 wherein said first unilateral current path includes an inductance and a capacitance.

17. Apparatus according to claim 13 wherein each of said first and second sets of conductors comprise radially extending tubes affixed in a hub.

18. Apparatus according to claim 13 wherein each of said first and second sets of conductors comprise parallel tubes or rods mounted in a circular configuration.

19. Apparatus according to claim 13 further including a hermetically-sealing housing enclosing said first and second sets of conductors.

References Cited in the file of this patent

UNITED STATES PATENTS 2,542,494    Felici _____ Feb. 20, 1951